United States Patent
Inoda et al.

(10) Patent No.: US 8,135,144 B2
(45) Date of Patent: Mar. 13, 2012

(54) MICROPHONE SYSTEM, SOUND INPUT APPARATUS AND METHOD FOR MANUFACTURING THE SAME

(75) Inventors: Takeshi Inoda, Osaka (JP); Ryusuke Horibe, Osaka (JP); Shigeo Maeda, Hyogo (JP); Fuminori Tanaka, Osaka (JP); Toshimi Fukuoka, Kanagawa (JP)

(73) Assignees: Funai Electric Advanced Applied Technology Research Institute Inc., Osaka (JP); Funai Electric Co., Ltd., Osaka (JP)

( * ) Notice: Subject to any disclaimer, the term of this patent is extended or adjusted under 35 U.S.C. 154(b) by 726 days.

(21) Appl. No.: 12/275,986

(22) Filed: Nov. 21, 2008

(65) Prior Publication Data

US 2009/0136059 A1   May 28, 2009

(30) Foreign Application Priority Data

Nov. 22, 2007   (JP) .................. 2007-303327

(51) Int. Cl.
H04R 3/00   (2006.01)
(52) U.S. Cl. ........... 381/92; 381/122; 381/163; 381/355
(58) Field of Classification Search .................. 381/92, 381/122, 163, 355
See application file for complete search history.

(56) References Cited

U.S. PATENT DOCUMENTS

| | | | | |
|---|---|---|---|---|
| 5,189,425 | A * | 2/1993 | Dabbs | 342/52 |
| 6,549,630 | B1 * | 4/2003 | Bobisuthi | 381/94.7 |
| 7,164,620 | B2 | 1/2007 | Hoshuyama | |
| 2003/0072460 | A1 * | 4/2003 | Gonopolskiy et al. | 381/92 |
| 2007/0127759 | A1 | 6/2007 | Zhang et al. | |

FOREIGN PATENT DOCUMENTS

| | | |
|---|---|---|
| EP | 1 489 596 A1 | 12/2004 |
| JP | 7-312638 | 11/1995 |
| JP | 9-331377 | 12/1997 |
| JP | 2001-186241 | 7/2001 |

OTHER PUBLICATIONS

Extended European Search Report for Application No. 08020325.0-2225, mailed on Mar. 4, 2009 (9 pages).
Elko G.W.: "Microphone Array Systems for Hands-Free Telecommunication" Speech Communication, Elsevier Science Publishers, Amsterdam, NL, vol. 20, No. 3-4, Dec. 1, 1996, pp. 229-240, XP004729887, ISSN: 0167-6393 (12 pages).

* cited by examiner

Primary Examiner — Wai Sing Louie
(74) Attorney, Agent, or Firm — Osha Liang LLP

(57) ABSTRACT

A microphone system, includes: a housing, adapted to be placed in a reference position relative to a sound source; a first microphone, configured to receive sound from the sound source at a first position within the housing; a second microphone, configured to receive sound from the sound source at a second position within the housing; and a differential signal generator, wherein: the first and second positions are arranged on a first line; and the first line perpendicularly intersects a second line that is extended from the sound source at a third position which is not between the first and second positions, and obliquely intersects a third line that is extended from the sound source at a fourth position which is between the first and second positions, when the housing is placed at the reference position.

5 Claims, 13 Drawing Sheets $$P = K \frac{1}{R}$$

MICROPHONE SYSTEM, SOUND INPUT APPARATUS AND METHOD FOR MANUFACTURING THE SAME

BACKGROUND

1. Field of the Invention

The present invention is related to a microphone system, a sound input apparatus, and a method for manufacturing the microphone system and the sound input apparatus.

2. Description of the Related Art

When telephone communications established by telephones, speech recognition, voice recording operations, and the like are carried out, it is desirable to collect only target voices (voices of users). However, under use environments of sound input apparatuses, sounds other than target voices such as background noise may be present. As a result, sound input apparatuses having functions capable of eliminating noises have been actively developed, as disclosed in JP-A-7322388.

As technical ideas capable of eliminating noises under use environments where these noises are present, methods for eliminating noises by applying sharp directivity to microphones have been proposed in the technical field.

Also, in recent year, compactnesses of electronic appliances have been progressed, so that such technical ideas capable of making sound input apparatuses compact may constitute important factors.

As microphones having directivity, a differential microphone is known which produces a difference signal indicative of a difference between voltage signals outputted from two sets of microphones, and then, the produced differential signal is utilized. FIG. 13A and FIG. 13B are diagrams for schematically indicating an area which shows a directional characteristic of a normal single microphone, and another area which represents a directional characteristic of a differential microphone. Sound pressure levels (sensitivities of microphones) with respect to a direction of a sound source have been indicated by distances measured from centers to an outer edge of an area 900, an outer edge of an area 910-1, and an outer edge of an area 910-2.

FIG. 13A is a diagram for showing a directional characteristic obtained in such a case that a single microphone having an omnidirectional characteristic is arranged at a center. The omnidirectional microphone has no directivity, while sound pressure levels (namely, sensitivity of microphone) along respective directions are constant.

FIG. 13B is a diagram for indicating a directional characteristic of a differential microphone constituted by two sets of microphones. A relationship between positions and angles of these two microphones is represented in FIG. 14, namely, a perpendicular direction with respect to a straight line which connects two microphones is defined as 0 degree. The directional characteristic of the differential microphone becomes such a dual directional characteristic that sound pressure levels (sensitivities of microphones) become maximum values along both a direction of 90 degrees and a direction of 270 degrees, whereas sound pressure levels (sensitivities of microphones) become zero along a direction of 0 degree and a direction of 180 degrees.

As a consequence, in order to collect only a target voice by employing a differential microphone, an arrangement of the differential microphone with respect to a sound source constitutes a major factor.

SUMMARY

It is therefore one advantageous aspect of the invention to provide a microphone system and a sound input apparatus, which are equipped with functions capable of collecting a target voice in high sensitivities, and capable of eliminating sounds other than the target voice, and also to provide a method for manufacturing these microphone system and sound input apparatus.

According to an aspect of the invention, there is provided a microphone system, including: a housing, adapted to be placed in a reference position relative to a sound source; a first microphone, configured to receive sound from the sound source at a first position within the housing, and generate a first voltage signal in accordance with the sound received at the first position; a second microphone, configured to receive sound from the sound source at a second position within the housing, and generate a second voltage signal in accordance with the sound received at the second position; and a differential signal generator, configured to receive the first voltage signal and the second voltage signal, and generate a differential signal indicative of a difference between the first voltage signal and the second voltage signal, wherein: the first and second positions are arranged on a first line; and the first line perpendicularly intersects a second line that is extended from the sound source at a third position which is not between the first and second positions, and obliquely intersects a third line that is extended from the sound source at a fourth position which is between the first and second positions, when the housing is placed at the reference position.

When a microphone has a sound collecting port, a position of the microphone may be set to the position of the sound collecting port, whereas when a microphone has not such a sound collecting port, a position of the microphone may be set to a position of a vibration film.

The setting positions of the first and second microphones may be selected from, for instance, a position of the first microphone, a position of the second microphone, a center point between the positions of the first and second microphones, or a typical point selected from an area located in the vicinity of the first and second microphones.

The predetermined ratio may be selected to be, for example, such a ratio smaller than, or equal to approximately −6 dB (namely, range defined larger than, or equal to −6 dB, and smaller than, equal to −0 dB) from the maximum value of the sensitivities, while considering the human hearing sense. More preferably, the predetermined ratio may be selected to be a ratio smaller than, or equal to approximately, −3 dB (namely, range defined larger than, or equal to −3 dB, and smaller than, or equal to 0 dB) from the maximum value of the sensitivity.

In accordance with the above-described microphone system, since two sets of the microphones are arranged at the predetermined angle in such a manner that the sensitivities of the these microphones become such a ratio larger than, or equal to the predetermined ratio with respect to the maximum value of the directional characteristic, the target voice can be collected in the higher sensitivities, and also, the sounds except for the target voice can be removed based upon the directivity of the differential microphone, and the attenuation characteristic caused by the distance.

According to another aspect of the invention, in the above-described microphone system, the first position and the second position are arranged such that the second line and the third line defines an angle which falls within either a range from 30 degrees to 150 degrees or a range from 210 degrees to 330 degrees.

In accordance with the above-described microphone system, the sensitivity with respect to the sounds produced from the reference position can be selected to be smaller than, or equal to approximately −6 dB from the maximum value of the sensitivities.

According to still another aspect of the invention, in the above-described microphone system, the first and second microphones are semiconductor devices.

For instance, the first and second microphones may be made as silicon microphones (Si microphones). Then, the first and second microphones may be alternatively constructed as a single integrated circuit device. At this time, the first and second microphones may be alternatively constructed on a single semiconductor substrate in combination with the differential signal producing unit. Also, the differential signal producing circuit and the first and second microphones may be alternatively arranged as a so-called "MEMS (Micro Electro Mechanical System)." It should also be noted that the first and second vibration films may be alternatively realized by such a vibration film which performs acoustic-to-electric transducing operation based upon a piezoelectric effect by utilizing either an inorganic piezoelectric thin film or an organic piezoelectric thin film.

In accordance with the above-described microphone system, since the microphones are constructed as the semiconductor devices, the entire microphone system can be made compact.

According to still another aspect of the invention, in a sound input apparatus containing the above-described microphone system and a speaker disposed in the housing and arranged on the first line, the speaker being configured to generate sound, the above-described reference position may be set based upon a position of the speaker.

In accordance with the above-described sound input apparatus, voices of a talking person can be collected in the higher sensitivity, whereas the sounds except for the voices of the talking person can be eliminated by the directivity of the differential microphone, and the attenuation characteristic caused by the distances.

According to still another aspect of the invention, in the above-described sound input apparatus, a reference position range where the reference position is set has such a range defined from a first reference position located at the closemost position with respect to the speaker to a second reference position located at the farmost position with respect to the speaker; a foot of a first perpendicular drawn from the first reference position to the straight line passing through the positions of the first and second microphones is assumed as a first boundary position, and a foot of a second perpendicular drawn from the second reference position to the straight line passing through the positions of the first and second microphones is assumed as a second boundary position; a range where an angle cannot satisfy the predetermined angle, and the angle is defined between the first perpendicular, and a straight line which connects the setting positions of the first and second microphones with the sound source is assumed as a first prohibition range; a range where an angle cannot satisfy the predetermined angle, and the angle is defined between the second perpendicular, and the straight line which connects the setting positions of the first and second microphones with the sound source is assumed as a second prohibition range; a range defined from the first boundary position to the second boundary position is assumed as a third prohibition range; and the first and second microphones may be arranged in any range except for the first prohibition range to the third prohibition range.

When a standard size of a human face is considered, for example, a dimension from a speaker to the first boundary position may be determined as approximately 100 mm, and another dimension from the speaker to the second boundary position may be determined as approximately 150 mm. Also, when a normal use mode of the sound input apparatus is considered, for example, a length from the reference position to a center point between the first and second microphones may be determined as approximately 50 mm.

In accordance with this sound input apparatus, even in such a case that a reference position is set based upon a constant range, voices of a talking person can be collected in the higher sensitivity, whereas the sounds except for the voices of the talking person can be eliminated by the directivity of the differential microphone, and the attenuation characteristic caused by the distances.

According to still another aspect of the invention, in the above-described sound input apparatus, the first and second microphones are arranged in such a manner that the predetermined angle becomes any of angle values within such an angle range that the angles are larger than, or equal to 30 degrees and smaller than, or equal to 150 degrees, otherwise, larger than, or equal to 210 degrees and smaller than, or equal to 330 degrees.

In accordance with the above-described sound input apparatus, it is possible to provide such a sound input apparatus that the sensitivity with respect to the voices of the talking person is set to be small than, or equal to approximately −6 dB from the maximum value of the sensitivities.

According to still another aspect of the invention, in the above-described sound input apparatus, a distance between the speaker and the fourth position falls within either a range from zero to 75 mm or a range no less than 175 mm.

In accordance with the above-described sound input apparatus, it is possible to provide such a sound input apparatus that the sensitivity with respect to the voices of the talking person is set to be small than, or equal to approximately −6 dB from the maximum value of the sensitivities.

According to still another aspect of the invention, there is provided a method of manufacturing a microphone system, including: providing a housing adapted to be placed in a reference position relative to a sound source; disposing a first microphone configured to receive sound from the sound source at a first position within the housing; and disposing a second microphone configured to receive sound from the sound source at a second position within the housing, wherein: the first and second positions are arranged on a first line such that the first line perpendicularly intersects a second line that is extended from the sound source at a third position which is not between the first and second positions, and obliquely intersects a third line that is extended from the sound source at a fourth position which is between the first and second positions, when the housing is placed at the reference position.

In accordance with the present invention, it is possible to provide such a method for manufacturing the microphone system. That is, in this manufacturing method, since two sets of the microphones are arranged at such a setting angle which becomes a predetermined angle set in such a manner that the sensitivity with respect to the sounds from the reference position becomes a ratio larger than, or equal to the predetermined ratio with respect to the maximum value of the directional characteristic, a target voice can be collected in a high sensitivity, and sounds except for the target voice can be eliminated by the directional characteristic of the differential microphone, and the attenuation characteristic caused by the distance.

According to still another aspect of the invention, in the above-described microphone system manufacturing method, the first position and the second position are arranged such that the second line and the third line defines an angle which falls within either a range from 30 degrees to 150 degrees or a range from 210 degrees to 330 degrees.

In accordance with the above-described microphone system manufacturing method, it is possible to provide such a method for manufacturing the microphone system by which the sensitivity with respect to the sounds from the reference position can be set to be smaller than, or equal to approximately −6 dB from the maximum value of the sensitivity.

According to still another aspect of the invention, there is provided a method of manufacturing a sound input apparatus, including: providing the microphone system obtained by the above-mentioned method; and disposing a speaker configured to generate sound in the housing and on the first line.

In accordance with the method for manufacturing the sound input apparatus, it is possible to provide such a sound input apparatus manufacturing method by which the voice of the talking person can be collected in the high sensitivity, and the sounds except for the voice of the talking person can be eliminated by the directional characteristic of the differential microphone and the attenuation characteristic caused by the distance.

According to still another aspect of the invention, in the above-described method for manufacturing the sound input apparatus, a reference position range where the reference position is set has such a range defined from a first reference position located at the closemost position with respect to the speaker to a second reference position located at the farmost position with respect to the speaker; a foot of a first perpendicular drawn from the first reference position to the straight line passing through the positions of the first and second microphones is assumed as a first boundary position, and a foot of a second perpendicular drawn from the second reference position to the straight line passing through the positions of the first and second microphones is assumed as a second boundary position; a range where an angle cannot satisfy the predetermined angle, and the angle is defined between the first perpendicular, and a straight line which connects the setting positions of the first and second microphones with the sound source is assumed as a first prohibition range; a range where an angle cannot satisfy the predetermined angle, and the angle is defined between the second perpendicular, and the straight line which connects the setting positions of the first and second microphones with the sound source is assumed as a second prohibition range; a range defined from the first boundary position to the second boundary position is assumed as a third prohibition range; and the first and second microphones may be arranged in any range except for the first prohibition range to the third prohibition range.

In accordance with the method for manufacturing the sound input apparatus, even in such a case that the reference position is set to have a constant range, it is possible to provide such a sound input apparatus manufacturing method by which the voice of the talking person can be collected in the high sensitivity, and the sounds except for the voice of the talking person can be eliminated by the directional characteristic of the differential microphone and the attenuation characteristic caused by the distance.

According to still another aspect of the invention, in the method for manufacturing the sound input apparatus, the speaker is disposed such that a distance between the speaker and the fourth position falls within either a range from zero to 75 mm or a range no less than 175 mm.

In accordance with the above-described sound input apparatus manufacturing method, it is possible to provide such a sound input apparatus manufacturing method that the sensitivity with respect to the voices of the talking person can be set to be small than, or equal to approximately −6 dB from the maximum value of the sensitivities.

BRIEF DESCRIPTION OF THE DRAWINGS

Embodiment may be described in detail with reference to the accompanying drawings, in which.

DETAILED DESCRIPTION OF THE INVENTION

Referring now to drawings, a description is made of various embodiments to which the present invention has been applied. It should be understood that the present invention is not limited only to the below-mentioned embodiments. Also, it is so assumed that the present invention may include various sorts of technical ideas conceived by freely combining the below-mentioned contents with each other.

Firstly, referring to FIG. 1 to FIG. 6, a description is made of an arrangement of a microphone system 1 according to an embodiment, to which the present invention has been applied. It should also be noted that the below-mentioned microphone system 1 may be applied to, for instance, voice communication appliances such as portable telephones, public telephones, transceivers, headsets, and the like, or applied to recording appliances, amplifier systems (loud speakers), and the like.

Figure 1:
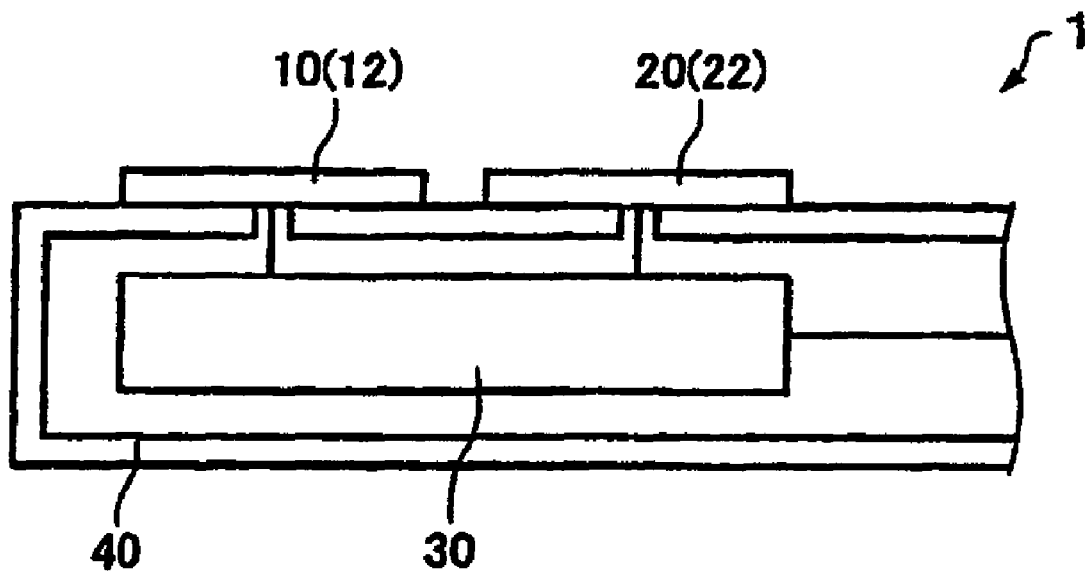
FIG. 1 is an explanatory diagram for explaining a microphone system according to an embodiment of the present invention.

FIG. 1 is a diagram for schematically showing one example as to the arrangement of the microphone system 1 according to the present embodiment, to which the present invention has been applied. The microphone system 1 contains a first microphone 10 having a first vibration film 12 and a second microphone 20 having a second vibration film 22. In this example, a microphone corresponds to an electro-acoustic transducer which transducers acoustic signals to electric signals. The first and second microphones 10 and 20 may be alternatively substituted by such transducers which output vibrations produced from the first vibration film 12 and the second vibration film 22 as voltage signals, respectively.

In the microphone system 1 according to the present embodiment, the first microphone 10 produces a first voltage signal. Also, the second microphone 20 produces a second voltage signal. That is, these voltage signals produced in the first and second microphones 10 and 20 may also be referred to as the first voltage signal and the second voltage signal.

Figure 2:
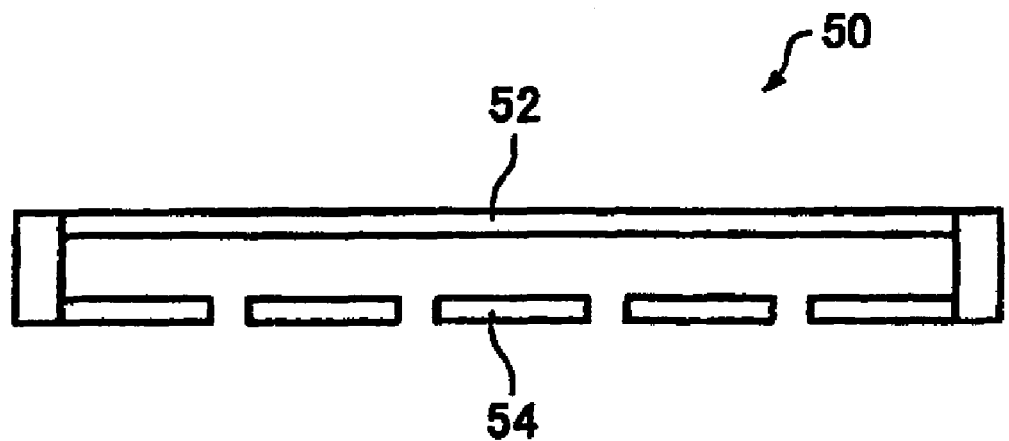
FIG. 2 is an explanatory diagram for explaining the microphone system according to the present embodiment of FIG. 1.

There is no specific restriction with respect to the mechanisms of the first and second microphones 10 and 20. FIG. 2 shows a construction of a capacitor type microphone 50 as one example of microphones which are applicable to the first and second microphones 10 and 20. The capacitor type microphone 50 contains a vibration film 52. The vibration film 52 corresponds to such a film (thin film) which is vibrated by receiving sound waves, and has an electric conductivity, and also has formed one terminal of an electrode. The capacitor type microphone 50 further has an electrode 54. The electrode 54 has been arranged opposite to the vibration film 52. As a result, both the vibration film 52 and the electrode 54 form a capacitance. When sound waves are entered to the capacitor type microphone 50, the vibration film 52 is vibrated, and thus, an interval between the vibration film 52 and the electrode 54 is changed, so that a capacitance between the vibration film 52 and the electrode 54 is changed. Since this capacitance change is outputted as, for example, a change in voltages, the sound waves entered to the capacitor type microphone 50 can be converted into electric signals. It should also be noted that in the capacitor type microphone 50, the electrode 54 may be alternatively made of such a construction which is not influenced by sound waves. For instance, the electrode 54 may alternatively have a mesh structure.

It should also be understood that a microphone which can be applied to the present invention is not limited only to the above-described capacitor type microphone 50, but any other microphones known in the technical field may be alternatively applied thereto. For instance, as the first microphone 10 and the second microphone 20, dynamic type microphones, electro-magnetic type microphones, piezoelectric type (crystal type) microphones, and the like may be applied.

Alternatively, the first and second microphones 10 and 20 may be realized by a silicon microphone (Si microphone) in which the first and second vibration films 12 and 22 have been constructed by employing silicon. Since such a silicon microphone is utilized, both the first and second microphones 10 and 20 may be made compact and may realize high performance. At this time, the first and second microphones 10 and 20 may be alternatively constructed as a single integrated circuit device. That is, the first and second microphones 10 and 20 may be alternatively constructed on a single semiconductor substrate. At this time, a differential signal producing unit 30 (will be discussed later) may also be formed on the same single semiconductor substrate. In other words, the first and second microphones 10 and 20 may be alternatively arranged as a so-called "MEMS (Micro Electro Mechanical System)." It should also be noted that the first microphone 10 and the second microphone 20 may be alternatively constituted as individually separated silicon microphones. Furthermore, the first and second vibration films 12 and 22 may be alternatively realized by such a vibration film which performs acoustic-to-electric transducing operation based upon a piezoelectric effect by utilizing either an inorganic piezoelectric thin film or an organic piezoelectric thin film.

It should also be understood that in the microphone system 1 according to the present embodiment, there is no specific restriction as to directions of the first and second vibration films 12 and 22. Alternatively, the first and second vibration films 12 and 22 may be arranged in such a manner that the normals thereof are located parallel to each other. At this time, the first and second vibration films 12 and 22 may be alternatively arranged in such a manner that the normals thereof do not become the same straight lines. For example, the first and second vibration films 12 and 22 may be alternatively arranged in such a manner that these vibration films 12 and 22 are separately arranged on a surface of a base portion (for example, circuit board which is not shown) by securing an interval. Alternatively, the first and second vibration films 12 and 22 may be arranged in such a manner that positionings of these vibration films 12 and 22 are shifted along the normal directions. It should also be noted that the first and second vibration films 12 and 22 may be arranged in such a manner that the normals thereof are not located parallel to each other. Alternatively, the first and second vibration films 12 and 22 may be arranged the normals thereof are intersected to each other at a right angle.

The microphone system 1 according to the present embodiment is provided with the above-explained differential signal producing unit 30. The differential signal producing unit 30 produces a differential signal which indicates a difference (namely, voltage difference) between a first voltage signal acquired by the first microphone 10 and a second voltage signal acquired by the second microphone 20. The function of the differential signal producing unit 30 may be realized by employing an exclusively-used hardware circuit (differential signal producing circuit), or may be alternatively realized by executing a signal processing operation by a CPU, or the like.

The microphone system 1 according to the present embodiment may furthermore contain a signal amplifying unit which amplifies the differential signal. Alternatively, both the differential signal producing unit 30 and the signal amplifying unit may be realized by a single control circuit. It should also be noted that the microphone system 1 according to the present embodiment may be alternatively arranged without internally having the signal amplifying unit.

Figure 3:
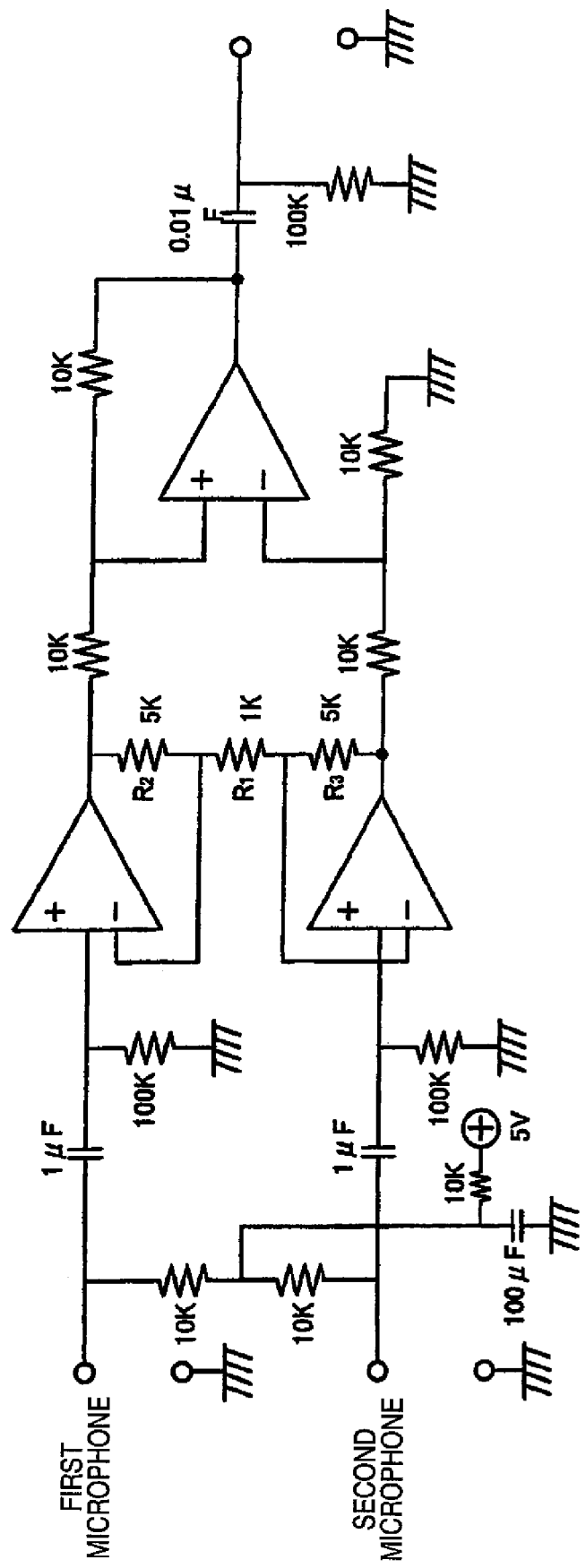
FIG. 3 is a circuit diagram capable of realizing a differential signal producing circuit and a signal amplifying unit employed in the microphone system of FIG. 1.

FIG. 3 indicates one example as to a circuit capable of realizing both the differential signal producing unit 30 and the signal amplifying unit. In accordance with the circuit shown in FIG. 3, upon receipt of the first and second voltage signals, such a signal is outputted which is produced by multiplying the differential signal indicative of the difference thereof by 10 times. It should also be noted that the circuit arrangement capable of realizing the differential signal producing unit 30 and the signal amplifying unit is not limited only to the above-described feasible circuit.

Alternatively, the microphone system 1 according to the present embodiment may contain a housing 40. In this alternative case, an outer shape of the microphone system 1 may be constructed of the housing 40. Also, a basic attitude may be set to the housing 40, so that a traveling path of input voices may be defined by this housing 40. Alternatively, the first and second vibration films 12 and 22 may be formed on the surface of the housing 40. Otherwise, the first and second vibration films 12 and 22 may be arranged within the housing 40 in such a manner that the first and second vibration films 12 and 22 are located opposite to an opening (sound collecting port) formed in the housing 40.

Figure 4:
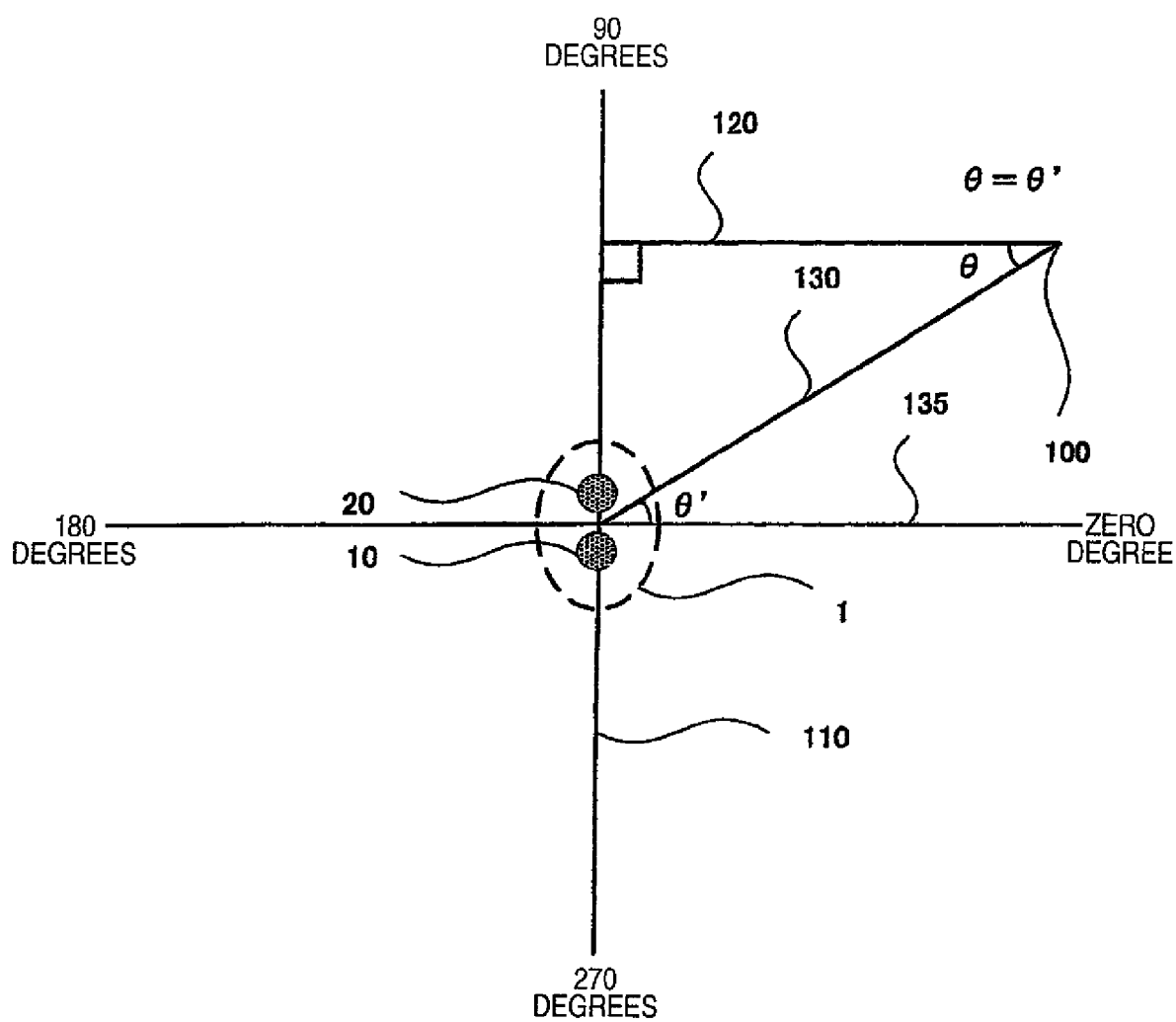
FIG. 4 is an explanatory diagram for explaining the microphone system according to the present embodiment of FIG. 1.

FIG. 4 is a diagram for explaining an arranging method of the microphone system 1 according to the present embodiment.

A reference position 100 corresponds to such a position which has been relatively set by the microphone system 1 based upon a predetermined sound source position with respect to the microphone system 1. In other words, in the present embodiment, it is so conceivable that the sound source is located at the reference position 100.

A straight line 110 corresponds to such a straight line which passes through a position of the first microphone 10 and a position of the second microphone 20. A position of a microphone may be defined as a position of a sound collecting port when the microphone has the sound collecting port, whereas a position of a microphone may be defined as a position of a vibration film when the microphone does not have a sound collecting port.

A perpendicular 120 corresponds to such a perpendicular which is drawn from the reference position 100 to the straight line 110.

A straight line 130 corresponds to such a straight line which connects setting positions of the first and second microphones 10 and 20 with the reference position 100. The setting positions of the first and second microphones 10 and 20 may be defined as, for example, the position of the first microphone 10, the position of the second microphone 20, a center point between the positions of the first and second microphones 10 and 20, or a typical point which is selected from points in the vicinity of the first and second microphones 10 and 20. In the present embodiment, the setting positions of the first and second microphones 10 and 20 have been defined as the center point between the positions of the first and second microphones 10 and 20.

Symbol "θ" indicates an angle defined by the perpendicular 120 and the straight line 130. The value of this angle "θ" is equal to a value of another angle "θ'" defined by the straight line 130 and the perpendicular 135 which passes through the setting positions of the first and second microphones 10 and 20.

Figure 5:
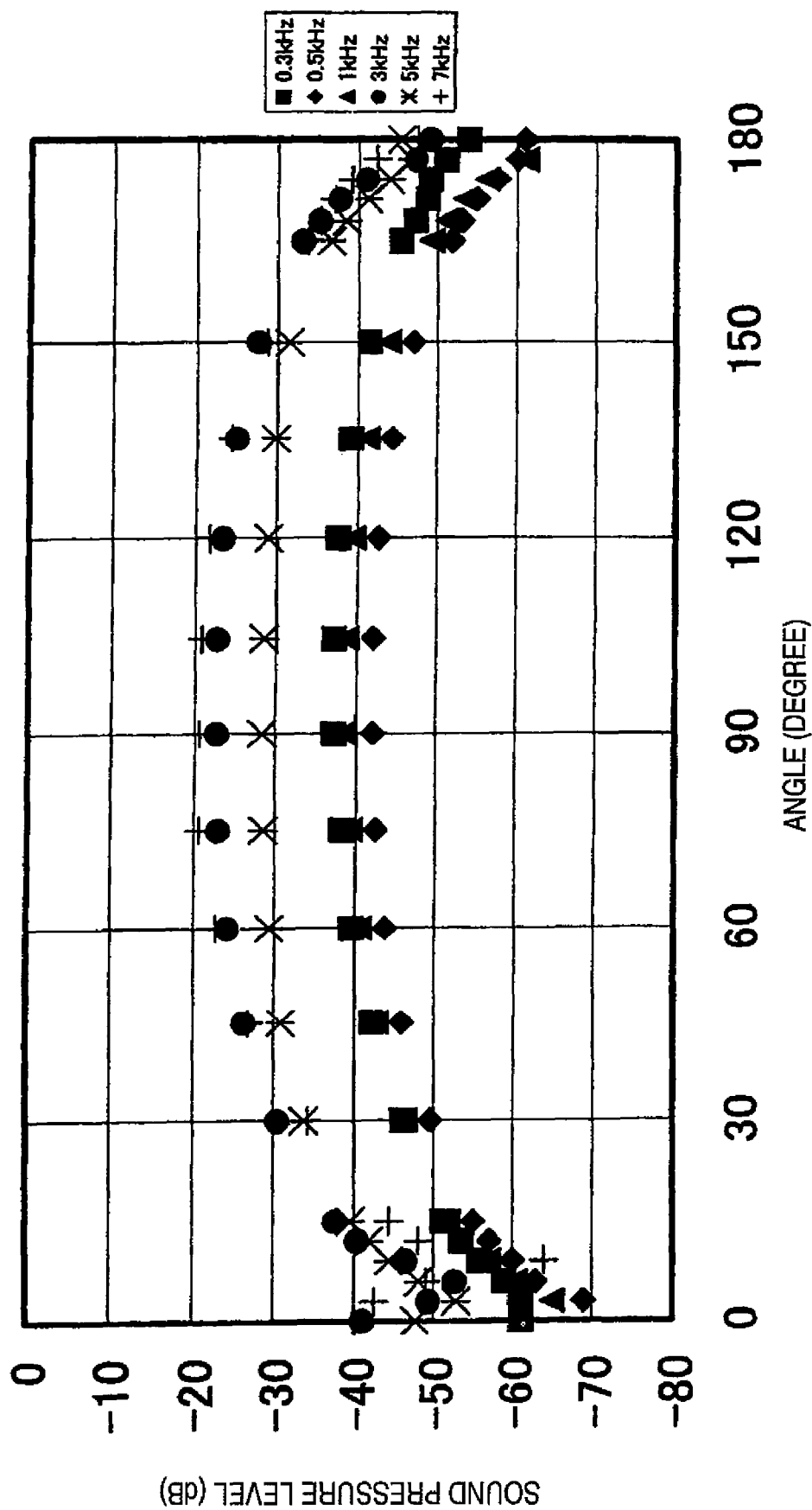
FIG. 5 is an explanatory diagram for explaining the microphone system according to the present embodiment of FIG. 1.

FIG. 5 is a graph for graphically indicating one example (actually measured values) of a directional characteristic of a differential microphone having the first and second microphones 10 and 20, which constitutes the microphone system 1 of the present embodiment.

In the graph of FIG. 5, while a distance defined from a sound source up to the differential microphone is a constant, when the value of angle "θ" is changed, sound pressure levels detected by the differential microphone are indicated based upon relative values. An abscissa of this graph indicates the values of angle "θ", and an ordinate thereof indicates the sound pressure levels. In the present measuring operation, it is conceivable that a sound pressure level is in proportion to a sensitivity of the differential microphone. The directional characteristics of the differential microphone were measured under such a condition that the values of angle "θ" were selected from zero degree up to 180 degrees, and as to frequencies of voices to be inputted, 6 sorts of frequencies were employed, namely, 0.3 KHz, 0.5 KHz, 1 KHz, 3 KHz, 5 KHz, and 7 KHz by considering a human audible frequency range. Similar to the schematic diagram shown in FIG. 13B, the sound pressure level becomes a maximum level when the value of angle "θ" was 90 degrees, and the smaller the sound pressure level was decreased, the closer the value of angle "θ" was approximated to zero degree and 180 degrees. As a consequence, in order to collect only a target voice by employing the differential microphone, an arrangement of the differential microphone with respect to the sound source constitutes an important factor.

As a consequence, in the microphone system 1, the value of angle "θ" is set in such a manner that a sensitivity with respect to sounds from the reference position 100 becomes such a ratio larger than, or equal to a predetermined ratio with respect to the maximum value of the directional characteristic thereof, so that a target voice can be collected in a higher sensitivity.

For instance, in order that a sensitivity with respect to sounds from the reference position 100 is set to be approximately −6 dB from the maximum value of the sensitivity, the value of angle "θ" may be set to be larger than, or equal to 30 degrees, and smaller than, or equal to 150 degrees. Also, for example, in order that a sensitivity with respect to sounds from the reference position 100 is set to be approximately −3 dB from the maximum value of the sensitivity, the value of angle "θ" may be set to be larger than, or equal to 45 degrees, and smaller than, or equal to 135 degrees.

Figure 13A:
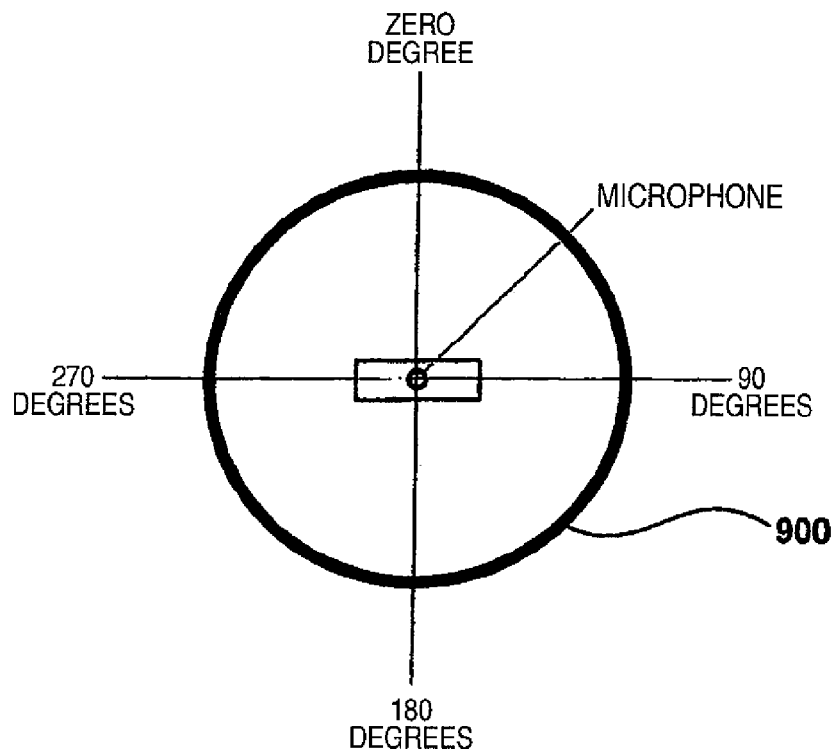
FIG. 13A and FIG. 13B are explanatory diagrams for explaining directional characteristics of differential microphones.
Figure 13B:
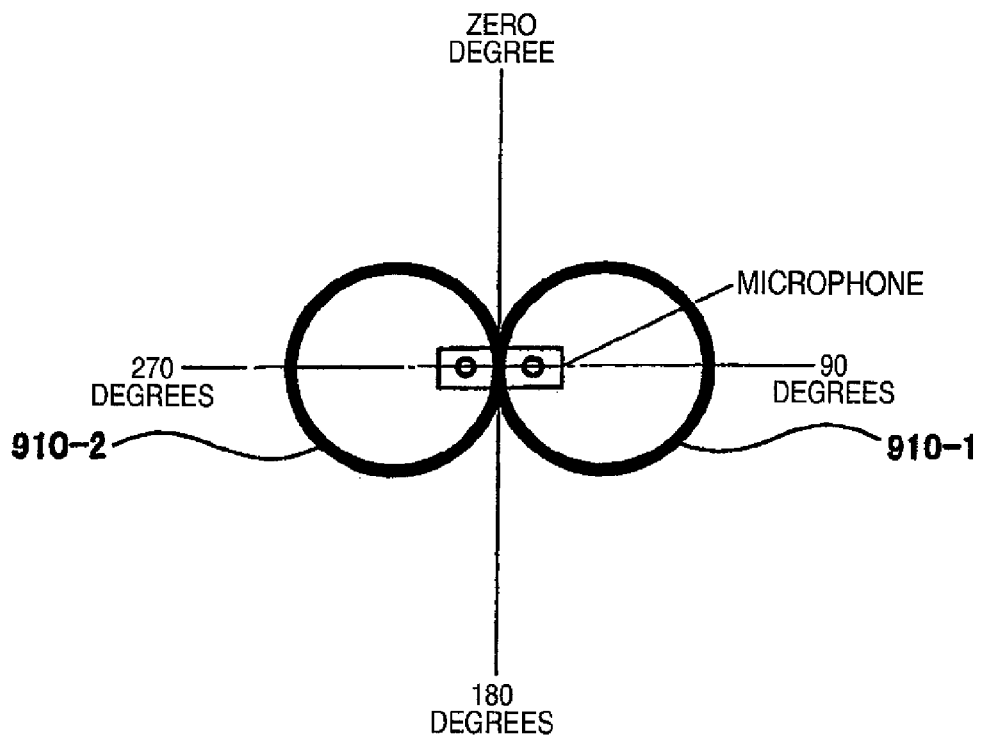
Figure 14:
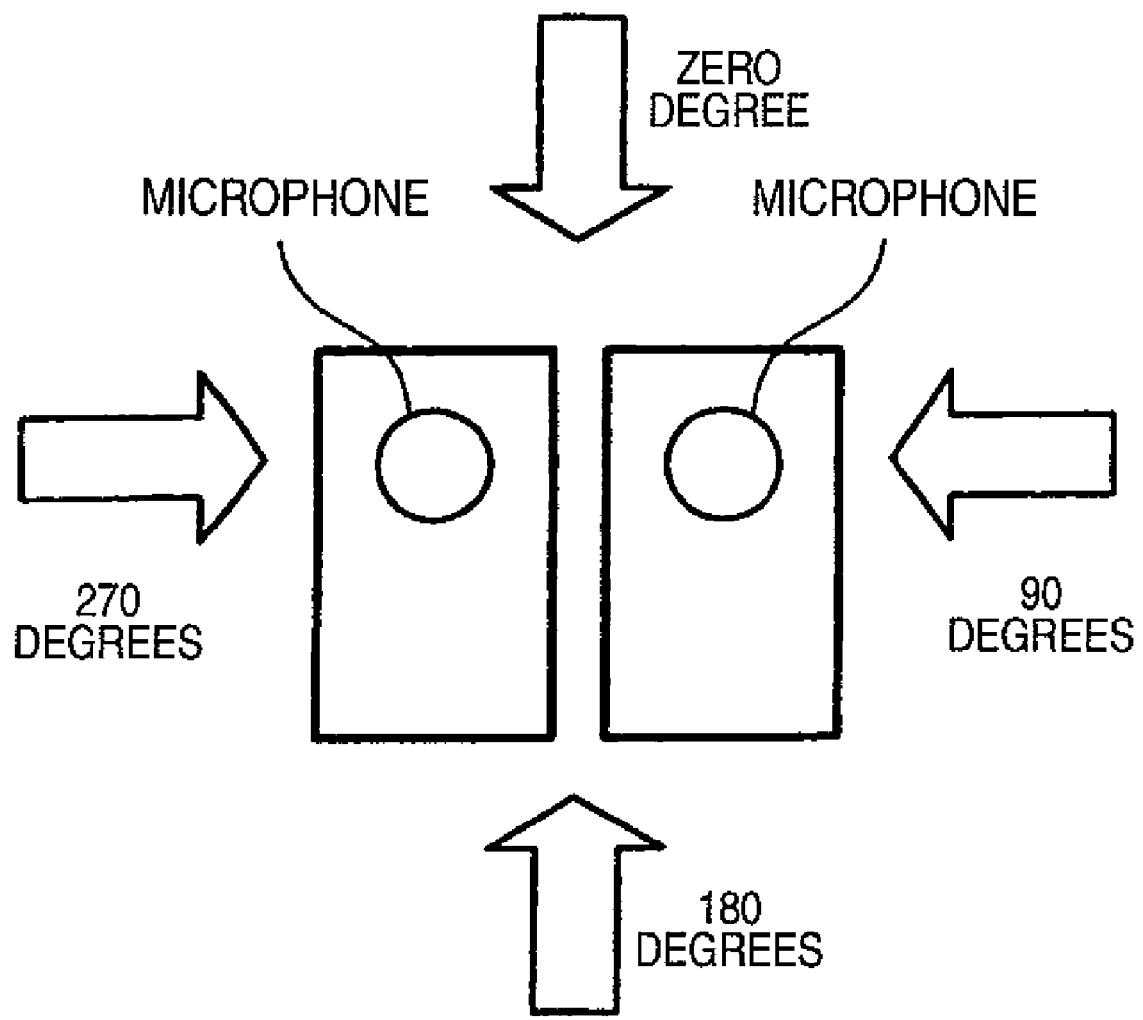
FIG. 14 is an explanatory diagrams for explaining a directional characteristic of a differential microphone.

It should be understood that although the value of angle "θ" has been defined from zero degree to 180 degrees in the graph of FIG. 5, a directional characteristic for the values of angles "θ" from 180 degrees to 360 degrees is similar to the directional characteristic for the values of angles "θ" from zero degree to 180 degrees (as indicated in directional characteristic diagram of FIG. 13B). As a consequence, for example, in order that a sensitivity with respect to sounds from the reference position 100 is set to be approximately −6 dB from the maximum value of the sensitivity, the value of angle "θ" may be set to be larger than, or equal to 210 degrees, and smaller than, or equal to 330 degrees. Also, for instance, in order that a sensitivity with respect to sounds from the reference position 100 is set to be approximately −3 dB from the maximum value of the sensitivity, the value of angle "θ" may be set to be larger than, or equal to 225 degrees, and smaller than, or equal to 315 degrees.

Next, a description is made of a basic idea capable of eliminating sounds (noises) except for a target voice. In order to eliminate the noises, both the directional characteristic of the differential microphone and an attenuation characteristic caused by distances are utilized.

As previously described with reference to the graph of FIG. 5, the sensitivity of the differential microphone becomes the maximum value when the value of angle "θ" is 90 degrees, and the closer the value of angle "θ" is approximated to zero degree and 180 degrees, the lower the sensitivity of the differential microphone is decreased. In other words, the sensitivity of the differential microphone is lowered with respect to the noises produced from such positions that the value of angle "θ" is approximated to zero degree and also to 180 degrees. As a consequence, the noises generated from the positions where the value of angle "θ" is approximated to zero degree and 180 degrees can be eliminated based upon the directional characteristic of the differential microphone.

Also, while sounds are propagated through a medium, the sounds are attenuated, so that sound pressure (strengths and amplitudes of sound waves) is lowered. Sound pressure is in inverse proportion to a distance measured from a sound source. Sound pressure "P" can be expressed by the below-mentioned formula (1) in accordance with a relationship between the sound pressure "P" and a distance "R" from the sound source:

[Formula 1]

$$P = K \times 1/R \qquad (1)$$

Figure 6:
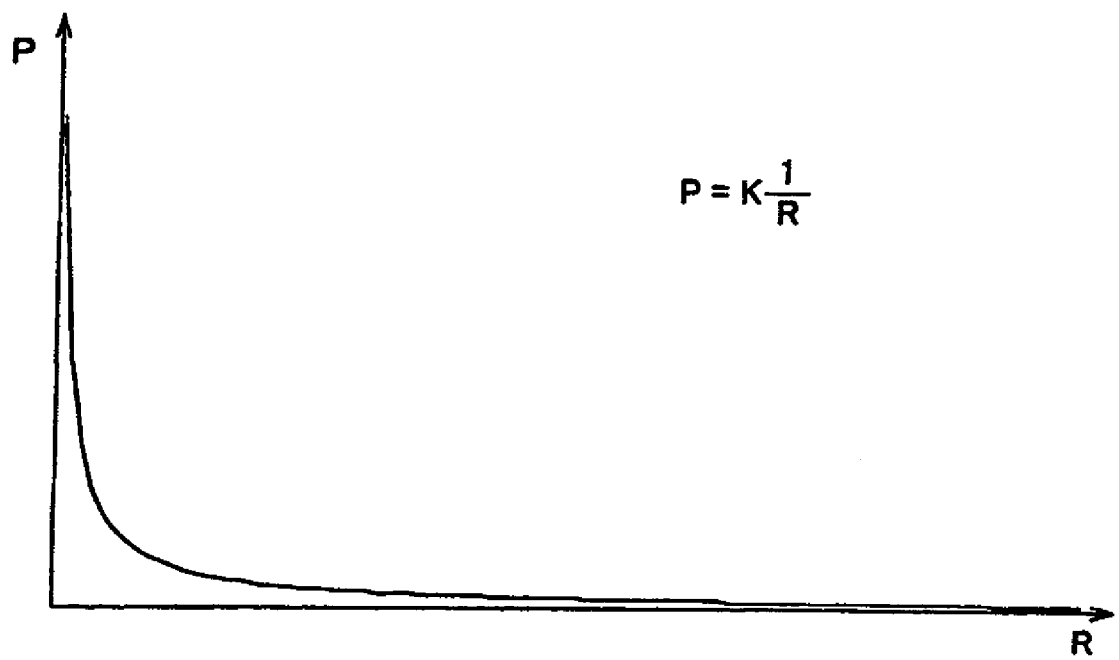
FIG. 6 is an explanatory diagram for explaining the microphone system according to the present embodiment of FIG. 1.

It should be noted that symbol "K" is a proportional constant. FIG. 6 is a graph for representing the above-described formula (1). As can be understood from this graph, the sound pressure (strengths and amplitudes of sound waves) "P" is rapidly attenuated at a position close to the sound source, and the further the position is separated from the sound source, the gentler the sound pressure "P" is attenuated. In the microphone system 1 according to the present embodiment, the noise components are eliminated by utilizing the attenuation characteristic, caused by the distance.

That is to say, more specifically, in a close-talking type microphone system, a user produces voices from a position located closer to the first and second microphones 10 and 20 (first and second vibration films 12 and 22) rather than a sound source of noises. As a result, the voices of the user are largely attenuated between the first vibration film 12 and the second vibration film 22, so that a difference may appear in strengths of the user voices contained in first and second voltage signals. To the contrary, since the sound source of the noises is remotely separated with respect to the first and second microphones 10 and 20, as compared with the voices of the user, the noise component is not substantially attenuated between the first and second vibration films 12 and 22. As a consequence, it may be regarded that there is no difference between strengths of the noises contained in the first and second voltage signals. Under such a circumstance, if a difference between the first voltage signal and the second voltage signal is detected, then the noises are canceled, so that such a voltage signal (differential signal) can be acquired which does not contain the noise component and indicates only the voice component of the user. In other words, it can be regarded that the difference signal is such a signal from which the noise component has been eliminated and which indicates the voice of the user.

As previously described, in accordance with the microphone system 1 of the present embodiment, the target voice can be collected in the higher sensitivity, whereas the sounds except for the target voice can be eliminated by the directivity of the differential microphone, and the attenuation characteristic caused by the distances.

Also, since both the first microphone 10 and the second microphone 20 are arranged at the predetermined angles in such a manner that the sensitivities of the first and second microphones 10 and 20 become such a ratio larger than, or equal to the predetermined ratio with respect to the maximum value of the directional characteristic, it is possible to manufacture such a microphone system that the target voice can be collected in the higher sensitivities, and also, the sounds except for the target voice can be removed based upon the directivity of the differential microphone, and the attenuation characteristic caused by the distance.

Firstly, referring to FIG. 7 to FIG. 12, a description is made of an arrangement of a sound input apparatus 2 according to another embodiment, to which the present invention has been applied. It should also be noted that the below-mentioned sound input apparatus 2 may be applied to, for instance, voice communication appliances such as portable telephones, public telephones, transceivers, headsets, and the like.

Figure 7:
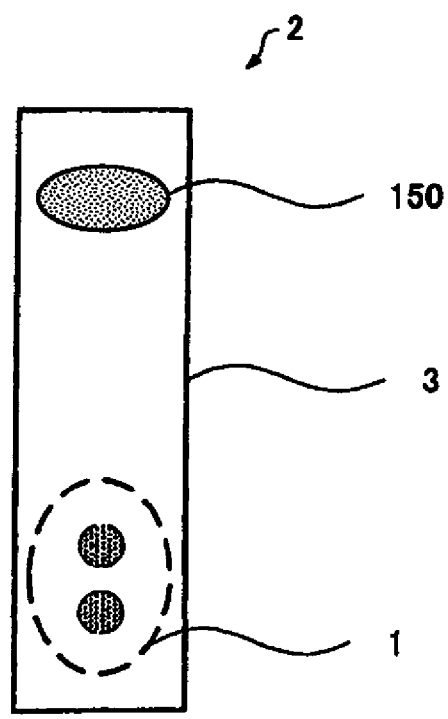
FIG. 7 is an explanatory diagram for explaining a sound input apparatus according to another embodiment of the present invention.

FIG. 7 is a diagram for schematically showing one example as to the arrangement of the sound input apparatus 2 according to the present embodiment, to which the present invention has been applied. The sound input apparatus 2 contains a microphone system 1. For example, as shown in FIG. 1, the microphone system 1 is arranged by containing a first microphone 10, a second microphone 12, and a differential signal producing unit 30. Since the detailed embodiment of the microphone system 1 has already been described with reference to FIG. 1 to FIG. 6, the descriptions thereof will be omitted in this embodiment.

The sound input apparatus 2 according to the present embodiment contains a speaker 150. The speaker 150 is arranged by such speakers which are known, or are well known in the technical field. For instance, other speakers may be alternatively employed which are utilized in, for instance, voice communication appliances such as portable telephones, public telephones, transceivers, headsets, and the like.

Alternatively, the sound input apparatus 2 according to the present embodiment may contain a housing 3. In this alternative case, an outer shape of the sound input apparatus 2 may be constructed of the housing 3. Also, the first and second microphones 10 and 20 may be formed on the surface of the housing 3. Otherwise, the first and second microphones 10 and 20 may be arranged within the housing 3 in such a manner that the first and second microphones 10 and 20 are located opposite to an opening (sound collecting port) formed in the housing 3.

Figure 8:
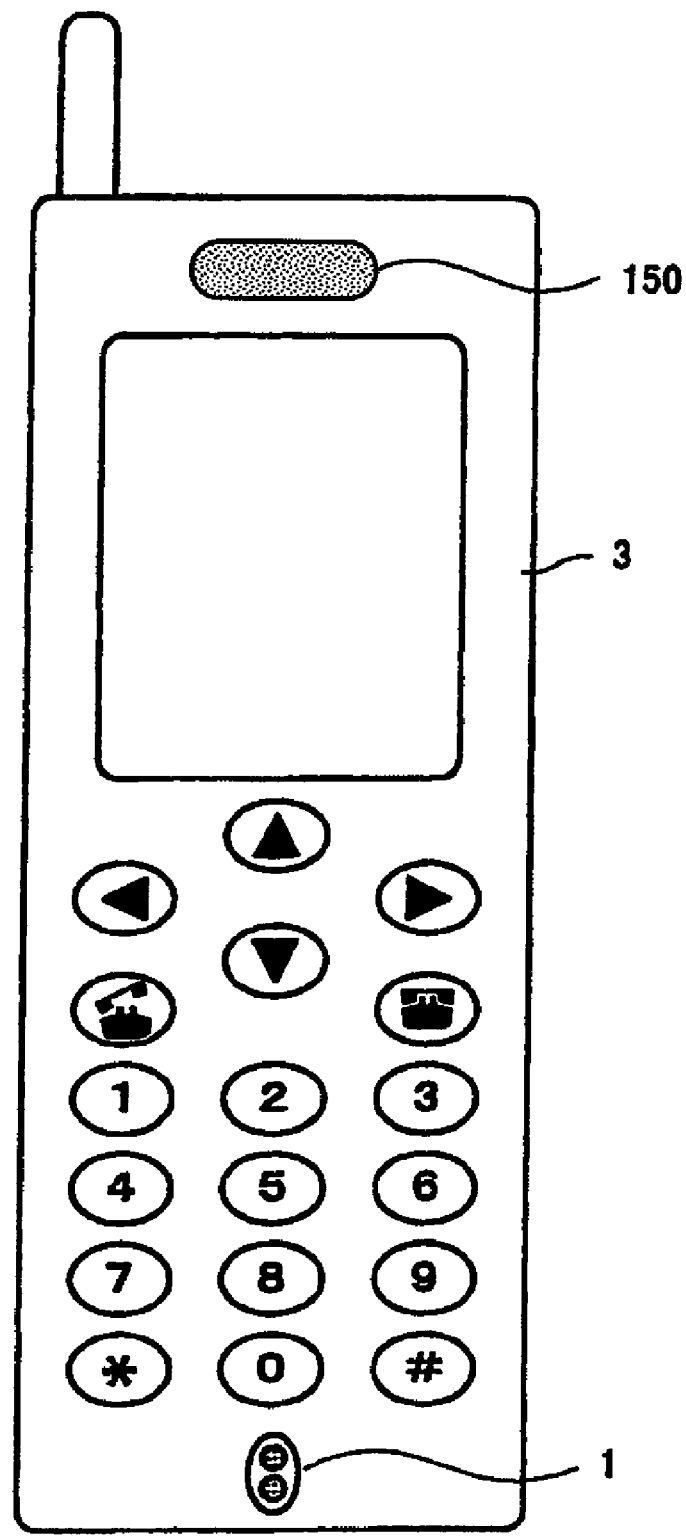
FIG. 8 is an explanatory diagram for explaining the sound input apparatus according to the present embodiment of FIG. 7.
Figure 9:
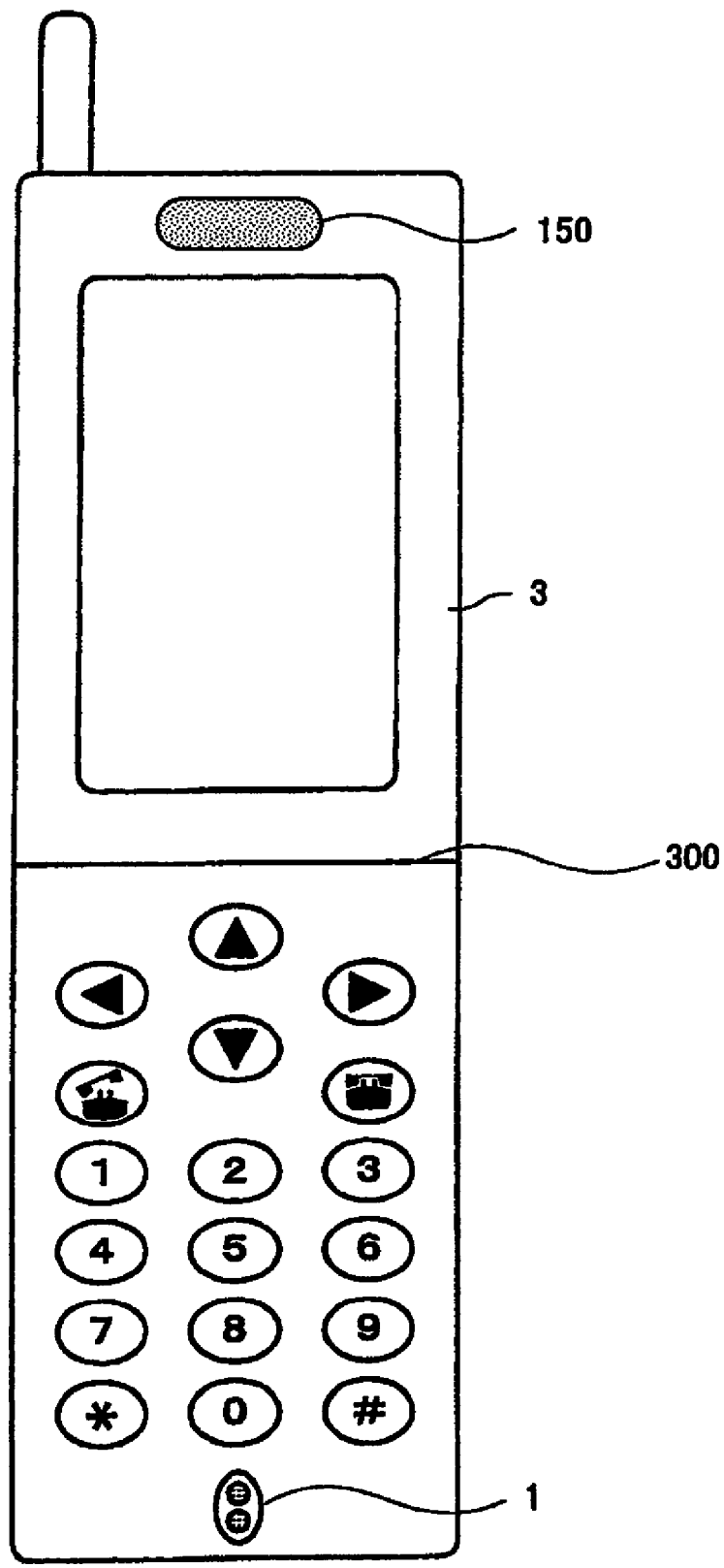
FIG. 9 is an explanatory diagram for explaining the sound input apparatus according to the present embodiment of FIG. 7.
Figure 10:
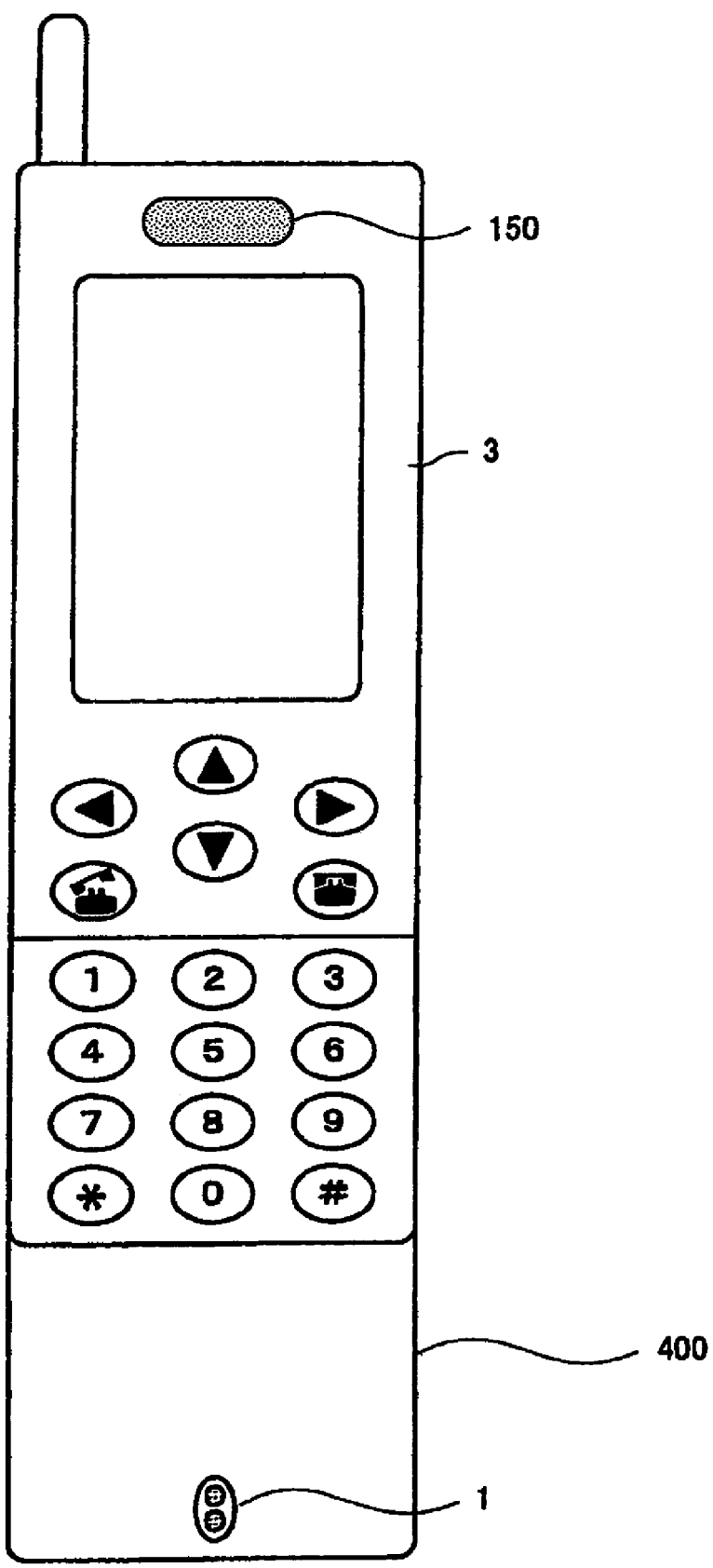
FIG. 10 is an explanatory diagram or explaining the sound input apparatus according to the present embodiment of FIG. 7.

The housing 3 may be arbitrarily constructed by containing the microphone system 1 and the speaker 150. Referring now to FIG. 8 to FIG. 10, a portable telephone is exemplified. As shown in FIG. 8, the housing 3 may be realized by that a movable portion is not provided as an integral body. Also, as represented in FIG. 9, the housing 3 may be realized by containing a folding portion 300 and an outer shape of an entire housing is changed. Furthermore, as indicated in FIG. 10, the housing 3 may be realized by containing a flipper portion 400 and an outer shape of a portion of the housing is changed.

Figure 11:
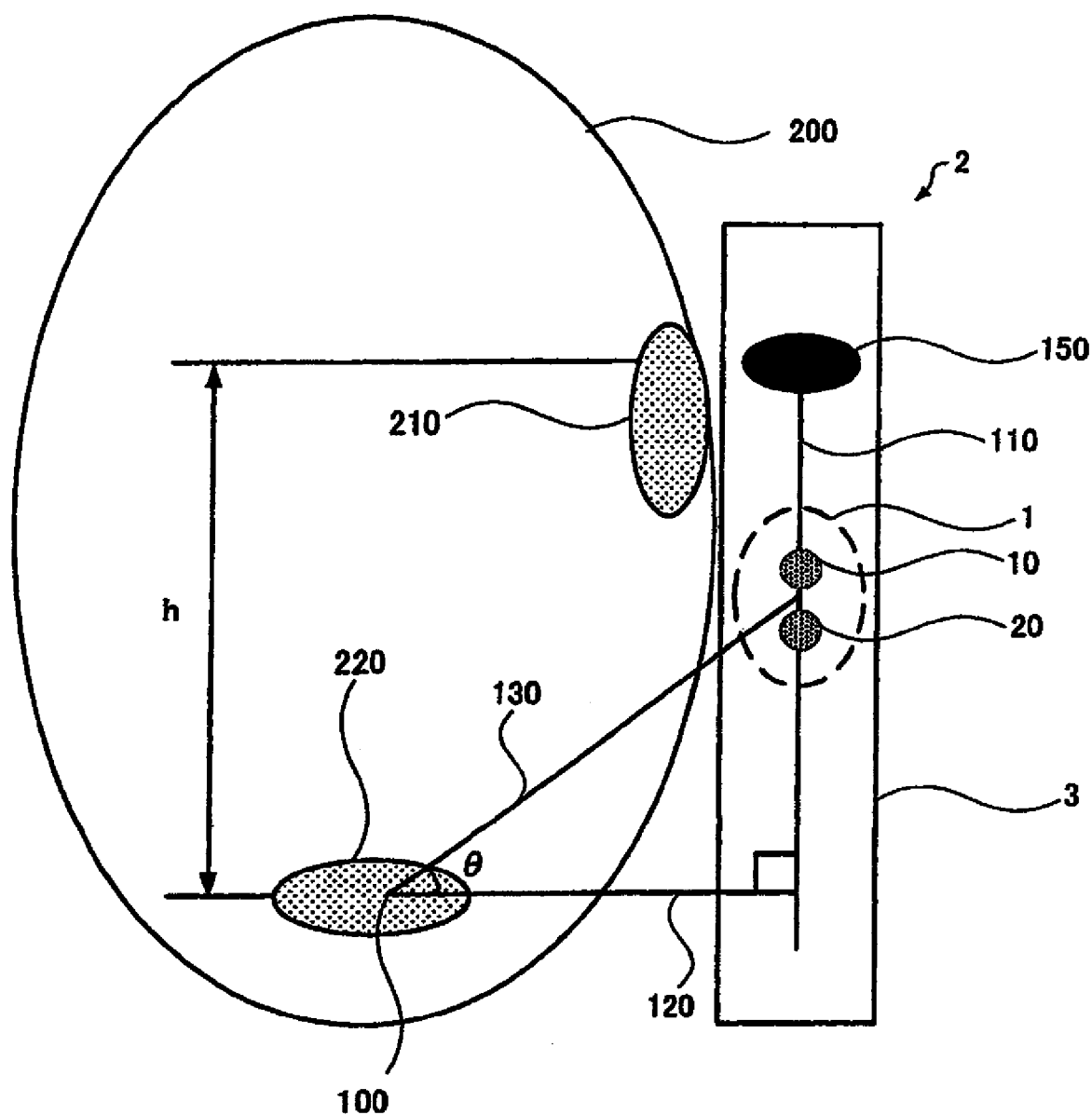
FIG. 11 is an explanatory diagram for explaining the sound input apparatus according to the present embodiment of FIG. 7.

FIG. 11 is an explanatory diagram for explaining a positional relationship between the speaker 150 and a head portion 200 of a talking person. It should be understood that the same reference numerals will be employed as those for denoting structural components which are commonly indicated in FIG. 4 and FIG. 7.

Since the contents as to the microphone system 1, the speaker 150, and the housing 3 have already been described, descriptions thereof will be omitted.

An arrangement between the sound input apparatus 2 and the head portion 200 of the talking person having an ear 210 and a mouth 220 may be relatively determined based upon a relationship with the speaker 150, depending upon the use mode of the sound input apparatus 2. For instance, in such a case that the sound input apparatus 2 is a portable telephone, such an arrangement may be conceived in which the speaker 150 is located in proximity to the ear 210 when the talking person establishes a telephone communication. Also, an arrangement between the ear 210 and the mouth 220 may be predicted by considering a standard dimension of a human face. For example, when a person stands up, a difference "h" of heights between the ear 210 and the mouth 220 is approximately 100 mm to 150 mm.

As a consequence, a position of a sound source which is scheduled by the sound input apparatus 2, namely, a position of the mouth 220 can be relatively set with respect to the sound input apparatus 2 based upon a position of the speaker 150. In the present embodiment, such a position is defined as a reference position 100, which has been relatively set with respect to the sound input apparatus 2 based upon the position of the speaker 150.

A straight line 110 corresponds to such a straight line which passes through a position of the first microphone 10 and a position of the second microphone 20. A position of a microphone may be defined as a position of a sound collecting port when the microphone has the sound collecting port, whereas a position of a microphone may be defined as a position of a vibration film when the microphone does not have a sound collecting port.

A perpendicular 120 corresponds to such a perpendicular which is drawn from the reference position 100 to the straight line 110.

A straight line 130 corresponds to such a straight line which connects setting positions of the first and second microphones 10 and 20 with the reference position 100. The setting positions of the first and second microphones 10 and 20 may be defined as, for example, the position of the first microphone 10, the position of the second microphone 20, a center point between the positions of the first and second microphones 10 and 20, or a typical point which is selected from points in the vicinity of the first and second microphones 10 and 20. In the present embodiment, the setting positions of the first and second microphones 10 and 20 have been defined as the center point between the positions of the first and second microphones 10 and 20.

Symbol "θ" indicates an angle defined by the perpendicular 120 and the straight line 130.

As indicated in the graph of FIG. 5, an example is represented, namely, actually measured values of a directional characteristic of a differential microphone having the first and second microphones 10 and 20, which constitutes the microphone system 1 of the present embodiment. As a consequence, in order to collect only a target voice by employing the differential microphone, an arrangement of the differential microphone with respect to a sound source constitutes an important factor.

As a consequence, in the sound input apparatus 2, the value of angle "θ" is set in such a manner that a sensitivity with respect to sounds from the reference position 100 becomes such a ratio larger than, or equal to a predetermined ratio with respect to the maximum value of the directional characteristic thereof, so that a target voice can be collected in a higher sensitivity.

For instance, in order that a sensitivity with respect to sounds from the reference position 100 is set to be approximately −6 dB from the maximum value of the sensitivity, the value of angle "θ" may be set to be larger than, or equal to 30 degrees, and smaller than, or equal to 150 degrees. Also, for example, in order that a sensitivity with respect to sounds from the reference position 100 is set to be approximately −3 dB from the maximum value of the sensitivity, the value of angle "θ" may be set to be larger than, or equal to 45 degrees, and smaller than, or equal to 135 degrees.

It should be understood that although the value of angle "θ" has been defined from zero degree to 180 degrees in the graph of FIG. 5, a directional characteristic for the values of angle "θ" from 180 degrees to 360 degrees is similar to the directional characteristic for the values of angles "θ" from zero degree to 180 degrees (as indicated in directional characteristic diagram of FIG. 13B). As a consequence, for example, in order that a sensitivity with respect to sounds from the reference position 100 is set to be approximately −6 dB from the maximum value of the sensitivity, the value of angle "θ" may be set to be larger than, or equal to 210 degrees, and smaller than, or equal to 330 degrees. Also, for instance, in order that a sensitivity with respect to sounds from the reference position 100 is set to be approximately −3 dB from the maximum value of the sensitivity, the value of angle "θ" may be set to be larger than, or equal to 225 degrees, and smaller than, or equal to 315 degrees.

Figure 12:
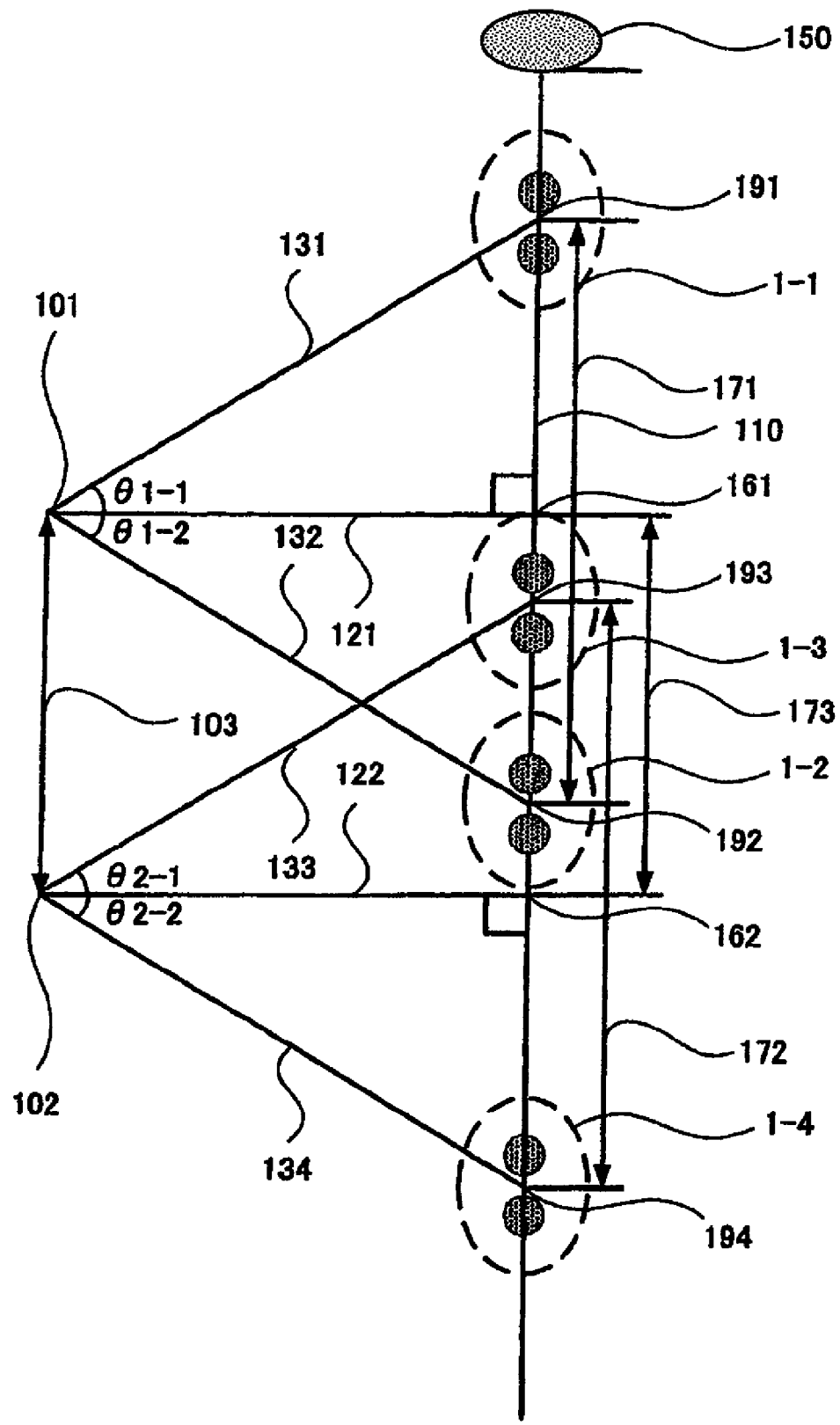
FIG. 12 is an explanatory diagram for explaining the sound input apparatus according to the present embodiment of FIG. 7.

FIG. 12 is a diagram for explaining an arrangement of the sound input apparatus 2 according to the present embodiment in such a case that a position of a sound source scheduled by the microphone system 1, namely, a reference position includes a predetermined range. As previously described, for instance, in such a case that the sound input apparatus 2 is a portable telephone, such an arrangement may be conceived in which the speaker 150 is located in proximity to the ear 210 when the talking person establishes a telephone communication. Also, an arrangement between the ear 210 and the mouth 220 may be predicted by considering a standard dimension of a human face. For example, when a person stands up, a difference "h" of heights between the ear 210 and the mouth 220 is approximately 100 mm to 150 mm. As a consequence, there is such a meaning that a predetermined range (approximately 50 mm in above-described case) is given to the sound source position, namely, the reference position scheduled by the microphone system 1.

It should also be understood that since the positional relationship among the head portion 200, the ear 210, and the mouth 220 of the talking person indicated in FIG. 11 may be commonly applied to the examples of FIG. 11 and FIG. 12, this positional relationship is omitted in FIG. 12. Also, in order to simplify descriptions and the drawing, the housing 3 is also omitted in FIG. 12.

Referring now to FIG. 12, a description is made of such a case that a reference position has a reference position range 103 defined from a first reference position 101 which is located at the closemost position from the speaker 150 to a second reference position 102 which is located at the farmost position from the speaker 150.

A straight line 110 corresponds to such a straight line which passes through a position of the first microphone 10 and a position of the second microphone 20. A position of a microphone may be defined as a position of a sound collecting port when the microphone has the sound collecting port, whereas a position of a microphone may be defined as a position of a vibration film when the microphone does not have a sound collecting port.

A perpendicular 121 corresponds to such a first perpendicular which is drawn from a first reference position 101 to the straight line 110, while a foot of the perpendicular 121 is defined as a first boundary position 161.

A perpendicular 122 corresponds to a second perpendicular which is drawn from a second reference position 102 to the straight line 110, while a foot of the perpendicular 122 is defined as a second boundary position 162.

A straight line 131 corresponds to such a straight line which connects the first reference position 101 to a setting position 191 of both the first and second microphones 10 and 20 in such a case that the microphone system 1 is arranged at a position 1-1. A straight line 132 corresponds to such a straight line which connects the first reference position 101 to a setting position 190 of both the first and second microphones 10 and 20 in such a case that the microphone system 1 is arranged at a position 1-2. A straight line 133 corresponds to such a straight line which connects the second reference position 102 to a setting position 193 of both the first and second microphones 10 and 20 in such a case that the microphone system 1 is arranged at a position 1-3. A straight line 134 corresponds to such a straight line which connects the second reference position 102 to a setting position 194 of both the first and second microphones 10 and 20 in such a case that the microphone system 1 is arranged at a position 1-4. The setting positions of the first and second microphones 10 and 20 may be defined as, for example, the position of the first microphone 10, the position of the second microphone 20, a center point between the positions of the first and second microphones 10 and 20, or a typical point which is selected from points in the vicinity of the first and second microphones 10 and 20. In the present embodiment, the setting positions of the first and second microphones 10 and 20 have been defined as the center point between the positions of the first and second microphones 10 and 20.

Symbol "θ1-1" shows an angle defined by the first perpendicular 121 and the straight line 131. Symbol "θ1-2" indicates an angle defined by the first perpendicular 121 and the straight line 132. Symbol "θ2-1" shows an angle defined by the second perpendicular 122 and the straight line 133. Symbol "θ2-2" indicates an angle defined by the second perpendicular 122 and the straight line 134.

As represented in the graph of FIG. 5, an example is indicated, namely, actually measured values of a directional characteristic of a differential microphone having the first and second microphones 10 and 20, which constitutes the microphone system 1 of the present embodiment. As a consequence, in order to collect only a target voice by employing the differential microphone, an arrangement of the differential microphone with respect to a sound source constitutes an important factor.

To this end, firstly, in the sound input apparatus 2, an arranging position for both the first and second microphones 10 and 20 in such a case that the value of angle "θ1-1" is set in such a manner that a sensitivity with respect to sounds from the first reference position 101 becomes such a ratio smaller than the predetermined ratio with respect to the maximum value of the directional characteristic is assumed as a position of an arranging position 191. Also, in the sound input apparatus 2, an arranging position for both the first and second microphones 10 and 20 in such a case that the value of angle "θ1-2" is set in such a manner that a sensitivity with respect to sounds from the first reference position 101 becomes such a ratio smaller than the predetermined ratio with respect to the maximum value of the directional characteristic is assumed as a position of an arranging position 192. Further, in the sound input apparatus 2, an arranging position for both the first and second microphones 10 and 20 in such a case that the value of angle "θ2-1" is set in such a manner that a sensitivity with respect to sounds from the second reference position 102 becomes such a ratio smaller than the predetermined ratio with respect to the maximum value of the directional characteristic is assumed as a position of an arranging position 193. Then, in the sound input apparatus 2, an arranging position for both the first and second microphones 10 and 20 in such a case that the value of angle "θ2-2" is set in such a manner that a sensitivity with respect to sounds from the second reference position 102 becomes such a ratio smaller than the predetermined ratio with respect to the maximum value of the directional characteristic is assumed as a position of an arranging position 194.

At this time, firstly, a range defined from the arranging position 191 to the arranging position 192 corresponds to a positional range where if the first and second microphones 10 and 20 are arranged, then the sensitivity with respect to the sounds from the first reference position 101 becomes such a ratio smaller than the predetermined ratio with respect to the maximum value of the directivity. This range is assumed as a first prohibition range 171.

Also, a range defined from the arranging position 193 to the arranging position 194 corresponds to a positional range where if the first and second microphones 10 and 20 are arranged, then the sensitivity with respect to the sounds from the second reference position 102, becomes such a ratio smaller than the predetermined ratio with respect to the maximum value of the directivity. This range is assumed as a second prohibition range 172.

Moreover, a range defined from the first boundary position 161 to the second boundary position 162 corresponds to such a range. That is, when the reference position (namely, position of sound source) is located within the range of the reference position range 103, in such a case that the first and second microphones 10 and 20 are arranged, such an angle can become zero degree, which is defined by a perpendicular drawn to a straight line for penetrating the positions of the first and second microphones 10 and 20 from the reference position, and another straight line which connects the setting positions of the first and second microphones 10 and 20 with the reference position. This range is assumed as a third prohibition range 173.

As a consequence, the first and second microphones 10 and 20 are arranged in any range other than the first prohibition range 171 through the third prohibition range 173, so that a sensitivity with respect to sounds produced from the reference position located in the range of the reference positional range 103 can be set to such a ratio larger than, or equal to the predetermined ratio with respect to the maximum value of the directional characteristic. In other words, the target voice can be collected in higher sensitivities.

For instance, in order that a sensitivity with respect to sounds from the reference position is set to be approximately −6 dB from the maximum value of the sensitivity, the values of angles "θ1-1" to "θ2-2" may be set to be larger than, or equal to 30 degrees, and smaller than, or equal to 150 degrees. Also, for example, in order that a sensitivity with respect to sounds from the reference position is set to be approximately −3 dB from the maximum value of the sensitivity, the values of angles "θ1-1" to "θ2-2" may be set to be larger than, or equal to 45 degrees, and smaller than, or equal to 135 degrees.

It should be understood that a directional characteristic for the values of angles from 180 degrees to 360 degrees is similar to the directional characteristic for the values of angles from zero degree to 180 degrees, as indicated in directional characteristic diagram of FIG. 13B. As a consequence, for example, in order that a sensitivity with respect to sounds from the reference position is set to be approximately −6 dB from the maximum value of the sensitivity, the values of angles "θ1-1" to "θ2-2" may be set to be larger than, or equal to 210 degrees, and smaller than, or equal to 330 degrees. Also, for instance, in order that a sensitivity with respect to sounds from the reference position 100 is set to be approximately −3 dB from the maximum value of the sensitivity, the values of angles "θ1-1" to "θ2-2" may be set to be larger than, or equal to 225 degrees, and smaller than, or equal to 315 degrees.

Alternatively, the reference positional range 103 may be selected to be approximately 50 mm by considering, for example, such a dimension matter that the difference between the ear 210 and the mouth 220 is approximately 100 mm to approximately 150 mm when the talking person stands up. Moreover, for example, under normal use mode of a sound input apparatus such as a portable telephone, a distance from a sound source (namely, mouth) up to the first and second microphones 10 and 20 may be alternatively selected to be approximately 50 mm, namely, a length defined from the straight line 131 to the straight line 134 may be selected to be approximately 50 mm.

In this case, for example, in order that a sensitivity with respect to sounds produced from the reference position is set lower than the maximum value of the sensitivity by approximate −6 dB, a distance "SM1" between the speaker 150 and the arranging position 191 may be given by the below-mentioned formula (2), assuming now that the value of angle "θ1-1" is 30 degrees:

[Formula 2]

$$SM1 \leq 100 - 50 \times \sin 30° = \text{approximately } 75 \text{[mm]} \quad (2)$$

Similarly, a distance "SM2" between the speaker 150 and the arranging position 194 may be given by the below-mentioned formula (3), assuming now that the value of angle "θ2-2" is 30 degrees:

[Formula 3]

$$SM2 \geq 150 + 50 \times \sin 30° = \text{approximately } 175 \text{[mm]} \quad (3)$$

As a consequence, since the distance between the speaker 150 and the setting position of the first and second microphones 10 and 20 is set to be longer than, or equal to 0 mm and shorter than, equal to 75 mm, otherwise, set to be longer than, or equal to 175 mm, such a sound input apparatus that a sensitivity with respect to a talking person is set lower than the maximum value of the sensitivity by approximately −6 dB can be formed.

Also, for example, in order that a sensitivity with respect to sounds produced from the reference position is set lower than the maximum value of the sensitivity by approximate −3 dB, a distance "SM1" between the speaker 150 and the arranging position 191 may be given by the below-mentioned formula (4), assuming now that the value of angle "θ1-1" is 45 degrees:

[Formula 4]

$$SM1 \leq 100 - 50 \times \sin 45° = \text{approximately } 64.6 \text{[mm]} \quad (4)$$

Similarly, a distance "SM2" between the speaker 150 and the arranging position 194 may be given by the below-mentioned formula (5), assuming now that the value of angle "θ2-2" is 45 degrees:

[Formula 5]

$$SM2 \geq 150 + 50 \times \sin 45° = \text{approximately } 185.4 \text{[mm]} \quad (5)$$

As a consequence, since the distance between the speaker 150 and the setting position of the first and second microphones 10 and 20 is set to be longer than, or equal to 0 mm and shorter than, equal to 64.6 mm, otherwise, set to be longer than, or equal to 185.4 mm, such a sound input apparatus that a sensitivity with respect to a talking person is set lower than the maximum value of the sensitivity by approximately −3 dB can be formed.

Next, a description is made of a basic idea capable of eliminating sounds (noises) except for a target voice. In order to eliminate the noises, both the directional characteristic of the differential microphone and an attenuation characteristic caused by distances are utilized.

As previously described with reference to the graph of FIG. 5, the sensitivity of the differential microphone becomes the maximum value when the value of angle "θ" is 90 degrees, and the closer the value of angle "θ" is approximated to zero degree and 180 degrees, the lower the sensitivity of the differential microphone is decreased. In other words, the sensitivity of the differential microphone is lowered with respect to the noises produced from such positions that the value of angle "θ" is approximated to zero degree and also to 180 degrees. As a consequence, the noises generated from the positions where the value of angle "θ" is approximated to zero degree and 180 degrees can be eliminated based upon the directional characteristic of the differential microphone. More specifically, for example, in voice communication appliances such as portable telephones, public telephones, transceivers, and headsets, the below-mentioned fact as to noises is known: That is, there are many possibilities that at a height substantially equal to the height of the head portion 200 of the talking person, noises are produced from a sound source separated far from the sound input apparatus 2 rather than the talking person, for instance, voices are produced from other persons. In other words, there are many noises at angles in the vicinity to either zero degree or 180 degrees in the directional characteristic represented in FIG. 5. As a consequence, the noises can be removed based upon the directional characteristic of the differential microphone.

As previously described with employment of FIG. 6 and the above-explained formula (1), the sound pressure (strengths and amplitudes of sound waves) "P" is rapidly attenuated at a position close to the sound source, and the further the position is separated from the sound source, the gentler the sound pressure "P" is attenuated. In the sound input apparatus 2 according to the present embodiment, the noise components are eliminated by utilizing the attenuation characteristic, caused by the distance.

That is to say, more specifically, in a close-talking type sound input apparatus, a user produces voices from a position located closer to the first and second microphones 10 and 20 (first and second vibration films 12 and 22) rather than a sound source of noises. As a result, the voices of the user are largely attenuated between the first vibration film 12 and the second vibration film 22, so that a difference may appear in strengths of the user voices contained in first and second voltage signals. To the contrary, since the sound source of the noises is remotely separated with respect to the first and second microphones 10 and 20, as compared with the voices of the user, the noise component is not substantially attenuated between the first and second vibration films 12 and 22. As a consequence, it may be regarded that there is no difference between strengths of the noises contained in the first and second voltage signals. Under such a circumstance, if a difference between the first voltage signal and the second voltage signal is detected, then the noises are canceled, so that such a voltage signal (differential signal) can be acquired which does not contain the noise component and indicates only the voice component of the user. In other words, it can be regarded that the difference signal is such a signal from which the noise component has been eliminated and which indicates the voice of the user.

As previously described, in accordance with the sound input apparatus 2 of the present embodiment, the target voice can be collected in the higher sensitivity, whereas the sounds except for the target voice can be eliminated by the directivity of the differential microphone, and the attenuation characteristic caused by the distances.

Also, since both the first microphone 10 and the second microphone 20 are arranged at the predetermined angles in such a manner that the sensitivities of the first and second microphones 10 and 20 become such a ratio larger than, or equal to the predetermined ratio with respect to the maximum value of the directional characteristic, it is possible to manufacture such a sound input apparatus that the target voice can be collected in the higher sensitivities, and also, the sounds except for the target voice can be removed based upon the directivity of the differential microphone, and the attenuation characteristic caused by the distance.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the invention can be applied to a configuration shown in FIG. 15.

Figure 15:
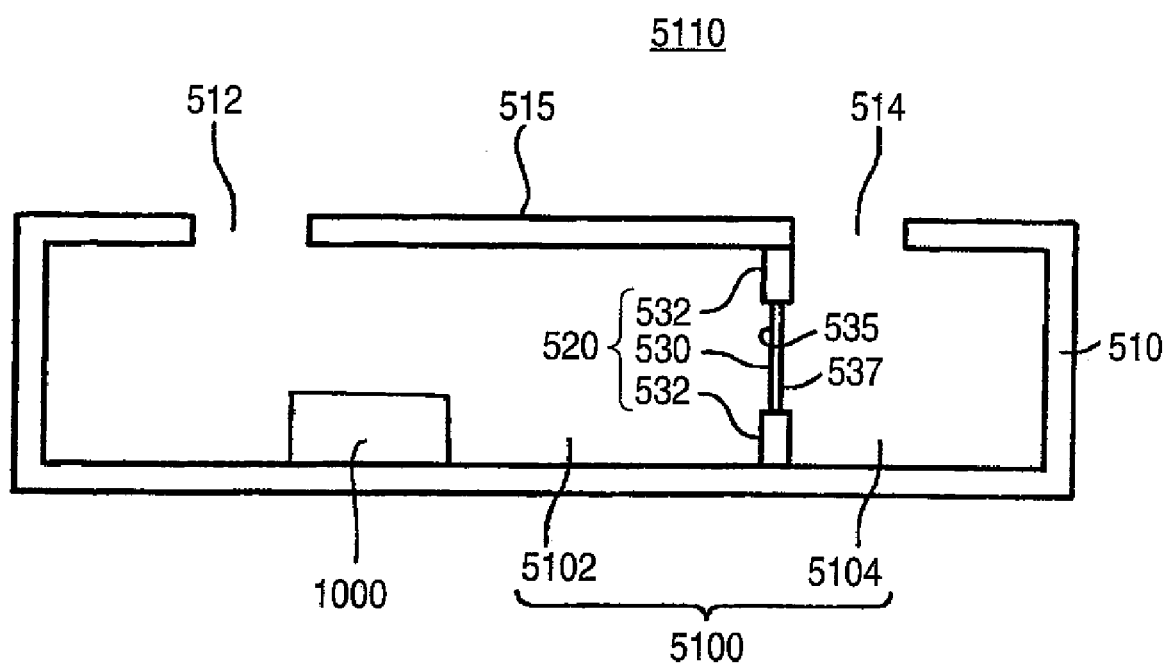
FIG. 15 is an explanatory diagram for explaining a microphone system according to another embodiment of the present invention.

As indicated in FIG. 15, a first and second sound-inlets 512 and 514 have been formed in a single plane 515 of a housing 510 made of the hexahedral structure (polyhedral structure). It should also be noted that as a modification, the first and second sound-inlets 512 and 514 may be alternatively formed in different planes of a polyhedral structure respectively. For instance, the first and second sound-inlets 512 and 514 may be alternatively formed in planes of a polyhedral structure, which are located opposite to each other, or may be alternatively formed in planes of the polyhedral structure, which are located adjacent to each other. Alternatively, plural pieces of the first sound-inlets 512, and plural pieces of the second sound-inlets 514 may be formed in the housing 510.

As shown in FIG. 15, a microphone unit 5110 has a partition member 520. The partition member 520 is provided in such a manner that an inner space 5100 is subdivided within the housing 510. The partition member 520 is provided in such a manner that the inner space 5100 is subdivided into a first space 5102 and a second space 5104. In other words, it can be regarded that the first space 5102 and the second space 5104 correspond to spaces segmented by the housing 10 and the partition member 520.

Alternatively, the partition member 520 may be provided in such a manner that a medium capable of propagating sound waves is not moved (cannot be moved) between the first space 5102 and the second space 5104. For example, the partition member 520 may be alternatively made of an airtight bulkhead which separates the inner space 5100 (first and second spaces 5102 and 5104) within the housing 510 in an air tight manner.

As indicated in FIG. 15, at least a portion of the partition member 520 has been formed by a vibration film 530. The vibration film 530 corresponds to such a member which is vibrated along a normal direction when sound waves are entered to this member. Then, in the microphone unit 5110, since an electric signal is extracted based upon vibrations of the vibration film 530, an electric signal indicative of voices entered to the vibration film 530 is acquired. In other words, the vibration film 530 may be realized by such a vibration film of a microphone (namely, electric/acoustic transducer for transuding acoustic signal into electric signal). Also, the vibration film 530 has a first surface 535 and a second surface 537. The first surface 535 is such a surface faced with the first space 5102, and the second surface 537 is such a surface faced with the second space 5104. A circuit 1000 generates a signal indicative of a difference between a sound inputted though the first sound-inlet 512 and a sound inputted though the second sound-inlet 514. Besides, the sound inputted though the first sound-inlet 512 is received on the first surface 535, and the sound inputted though the second sound-inlet 514 is received on the second surface 537, and then the difference between the sounds is mechanically detected by the vibration film 530. Besides, since the above configuration includes a single vibration film, the configuration can be easily realized.

According to the above configuration, the first sound-inlet 512, the first surface 535 and the first space 5102 are corresponding to the first microphone. Further, the second sound-inlet 514, the second surface 537 and the second space are corresponding to the second microphone. Therefore, this invention can be applied to the configuration shown in FIG. 15.

What is claimed is:

1. A microphone system, comprising:
    a housing, adapted to be placed in a reference position relative to a sound source;
    a first microphone, configured to receive sound from the sound source at a first position within the housing, and generate a first voltage signal in accordance with the sound received at the first position;
    a second microphone, configured to receive sound from the sound source at a second position within the housing, and generate a second voltage signal in accordance with the sound received at the second position; and
    a differential signal generator, configured to receive the first voltage signal and the second voltage signal, and generate a differential signal indicative of a difference between the first voltage signal and the second voltage signal, wherein:
    the first and second positions are arranged on a first line; and
    the first line perpendicularly intersects a second line that is extended from the sound source at a third position which is not between the first and second positions, and obliquely intersects a third line that is extended from the sound source at a fourth position which is between the first and second positions, when the housing is placed at the reference position.

2. The microphone system according to claim 1, wherein the first position and the second position are arranged such that the second line and the third line defines an angle which falls within either a range from 30 degrees to 150 degrees or a range from 210 degrees to 330 degrees.

3. The microphone system according to claim 1, wherein the first and second microphones are semiconductor devices.

4. A sound input apparatus, comprising:
    the microphone system according to claim 1; and
    a speaker disposed in the housing and arranged on the first line, the speaker being configured to generate sound.

5. The sound input apparatus according to claim 4, wherein:
    a distance between the speaker and the fourth position falls within either a range from zero to 75 mm or a range no less than 175 mm.

* * * * *